United States Patent
Kubota et al.

(10) Patent No.: US 7,127,107 B2
(45) Date of Patent: Oct. 24, 2006

(54) LAND PARTITION DATA GENERATING METHOD AND APPARATUS

(75) Inventors: Sen Kubota, Tokyo (JP); Takashi Onoyama, Tokyo (JP)

(73) Assignee: Hitachi Software Engineering Co., Ltd., Kanagawa (JP)

( * ) Notice: Subject to any disclaimer, the term of this patent is extended or adjusted under 35 U.S.C. 154(b) by 703 days.

(21) Appl. No.: 10/360,624

(22) Filed: Feb. 10, 2003

(65) Prior Publication Data

US 2003/0165258 A1    Sep. 4, 2003

(30) Foreign Application Priority Data

Mar. 1, 2002    (JP)    ............... 2002-055960

(51) Int. Cl.
    *G06K 9/48*    (2006.01)
(52) U.S. Cl. ............ 382/199; 382/103; 382/203; 382/266; 702/5
(58) Field of Classification Search ............... 382/154, 382/165, 197, 199, 203, 218, 103, 113, 266; 707/3, 104, 5
See application file for complete search history.

(56) References Cited

U.S. PATENT DOCUMENTS

| | | | | |
|---|---|---|---|---|
| 5,377,102 A * | 12/1994 | Nishiishigaki | ............ | 702/5 |
| 5,666,441 A * | 9/1997 | Rao et al. | ............ | 382/203 |
| 6,446,060 B1 * | 9/2002 | Bergman et al. | ............ | 707/3 |
| 6,470,265 B1 * | 10/2002 | Tanaka | ............ | 701/208 |
| 6,665,439 B1 * | 12/2003 | Takahashi | ............ | 382/199 |
| 6,687,392 B1 * | 2/2004 | Touzawa et al. | ............ | 382/128 |
| 6,714,664 B1 * | 3/2004 | Kambe et al. | ............ | 382/113 |
| 6,772,089 B1 * | 8/2004 | Ikeda et al. | ............ | 702/159 |
| 6,839,456 B1 * | 1/2005 | Touzawa et al. | ............ | 382/128 |
| 6,853,751 B1 * | 2/2005 | Milligan et al. | ............ | 382/199 |
| 6,970,593 B1 * | 11/2005 | Furukawa | ............ | 382/154 |
| 6,993,157 B1 * | 1/2006 | Oue et al. | ............ | 382/103 |

FOREIGN PATENT DOCUMENTS

| | | |
|---|---|---|
| JP | 8-18764 | 6/1994 |
| JP | 11-266373 | 3/1998 |

OTHER PUBLICATIONS

Joseph S. P. Shu, A New Heuristic Edge Extraction Technique, 1987, IEEE, pp. 285-288.*
Muhittin Gokmen et al, Edge Detection and Surface Reconstruction Using Refined Regularization, 1993, IEEE Transactions on Patterns Analysis and Machine Intelligence, vol., No. 5, pp. 492-499.*
C.C. Teoh et al, Extraction of Infrastructure Details from Fused Image, 2001, IEEE, pp. 1490-1492.*
Wenzhong Shi et al, The Line Segment Match Method for Extracting Road Network from High-Resolution Satellite Images, Feb. 2002, IEEE Transaction on Geoscience and Remote Sensing, vol. 40, No. 2, pp. 511-514.*

(Continued)

*Primary Examiner*—Gregory Desire
(74) *Attorney, Agent, or Firm*—Reed Smith LLP; Stanley P. Fisher, Esq.; Juan Carlos A. Marquez, Esq.

(57) ABSTRACT

A method and apparatus generates data concerning a partition of land such as farmland based on an observation image of the surface of the earth photographed by a high-altitude flying vehicle such as a satellite or airplane at high speed while reducing the burden on the user. The method comprises the steps of extracting edges in the observation image; extracting a rectangle region on the image by determining and connecting points of intersection of a plurality of straight lines extending radially from a point on the image and the edges; and adjusting the extracted rectangle region by refining and correcting it.

13 Claims, 14 Drawing Sheets

FLOWCHART OF OVERALL PROCESS

OTHER PUBLICATIONS

Tao Wen-Bing et al, A new Approach to Extract Rectangle Buildings form Aerial Urban Images, 2002, IEEE ICSP '02 Proceedings, pp. 143-146.*

Hankyu Moon et al, Optimal Edge-Based Shape Detection, Nov. 2002, IEEE Transactions on Image Processing, vol. 11, No. 11, pp. 1209-1226.*

M. Gerke et al, Building Extraction From Aerial Imagery Using a Generic Scene Model and Invariant Geometric Moments, Institute for Photogrmmetry and GeoInformation, University of Hannover, pp. 1-5.*

Samuel Vinson, Extraction of Rectangular Buildings in Aerial Images, 2001, Universite Paris IX Dauphine.*

* cited by examiner

FIG.2(a)

RECTANGLE MANAGEMENT INFORMATION

| ID 201 | ORIGINAL IMAGE ID 202 | RECTANGLE IMAGE ID 203 | NUMBER OF REGISTERED RECTANGLES 204 | AVERAGE AREA 205 | RECTANGLE INFORMATION 1 206 | RECTANGLE INFORMATION 2 207 | ... |
|---|---|---|---|---|---|---|---|
| X01 | AA123456 | BB4567 | 103 | 190 | | | |

FIG.2(b)

RECTANGLE INFORMATION

| RECTANGLE ID 211 | AREA OF RECTANGLE 212 | CENTER OF RECTANGLE 213 | AVERAGE LUMINANCE 214 | NUMBER OF VERTEXES 215 | COORDINATES OF VERTEX 1 216 | COORDINATES OF VERTEX 2 217 | ... |
|---|---|---|---|---|---|---|---|
| X01001 | 234 | (X0, Y0) | 110 | 15 | (X1, Y1) | (X2, Y2) | |

RECTANGLE IMAGE INFORMATION

PIXEL VALUES

| ID1 | ID1 | FF | ID2 | ID2 |
|-----|-----|-----|-----|-----|
| ID1 | ID1 | FF | ID2 | ID2 |
| ID1 | ID1 | FF | ID2 | ID2 |
| FF  | FF  | FF | FF  | ID2 |
| 00  | 00  | FF | ID3 | FF  |
| 00  | FF  | ID3 | ID3 | ID3 |
| 00  | FF  | ID3 | ID3 | ID3 |

FF: BOUNDARY PIXEL

IDn: INTRA-RECTANGLE PIXEL(INSIDE THE RECTANGLE DESIGNATED BY ID)

00: EXTRA-RECTANGLE PIXEL

EXTRACTION OF A RECTANGLE BY THE LINEAR
INTERSECTION POINT METHOD

FLOW OF SHARP-EDGE RECTANGLE CORRECTION

BLOCKDIAGRAM OF THE USER-INITIATED
CORRECTION PROCESS

FIG.11
EDGE EXTRACTION IMAGE
ORIGINAL IMAGE
(MONOCHROME) — 1101
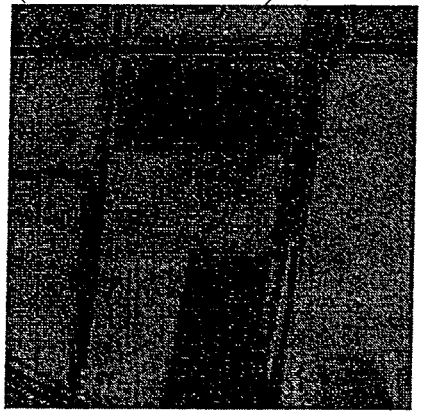
HISTOGRAM-EQUALIZED
IMAGE — 1102
IMAGE PROCESSED BY
CANNY METHOD — 1103
BINARIZED IMAGE — 1104
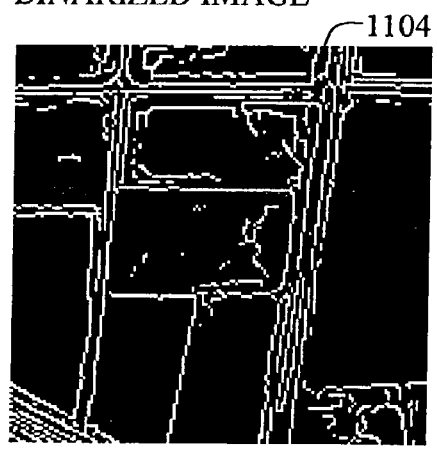
SMALL-EDGE ELIMINATED
IMAGE — 1105
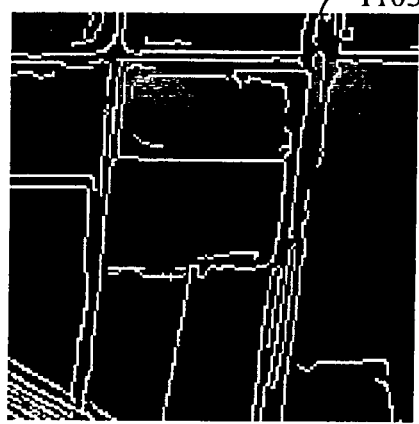
IMAGE AFTER MORPHOLOGY
PROCESS — 1106

TRANSITION OF A RECTANGLE EXTRACTION PROCESS

LAND PARTITION DATA GENERATING METHOD AND APPARATUS

BACKGROUND OF THE INVENTION

1. Technical Field

The present invention relates to a method and apparatus for generating data concerning partitions of land by analyzing an ground image photographed at high altitude by a high-altitude flying vehicle such as a satellite or an airplane.

2. Background Art

Satellite and aerial photography is becoming increasingly common. Various techniques are being developed for creating maps or analyzing the land surface, for example, based on images provided by the photography.

In particular, in order to analyze photographs of a farming area, a method is required for recognizing farmland partitions within an image.

A farmland partition is usually recognized by extracting from an image a polygon (to be hereafter referred to as a rectangle) enclosed by edges indicating farmland. As an example of the prior art for recognizing a rectangle in an image, JP Patent Publication (Unexamined Application) No. 11-266373 discloses an image processing apparatus. This apparatus employs an edge tracing technique in an edge-extracted and binarized image.

Further, JP Patent Application No. 6-146651 discloses an apparatus for rectangle processing in an intra-frame area. This apparatus employs a method whereby an area is designated by a marking pen or the like and then read as rectangle information.

The above-mentioned edge tracing technique for recognizing a rectangle area requires the user to judge as to the determination of the trace direction during the edge trace process. As a result, this technique is inevitably dialog-based, requiring much time and energy on the part of the user.

The other prior art technique, namely the designation of an area by a marker or the like, requires all of the areas needing recognition to be marked by the user in advance, thus also requiring the user to expend much energy.

SUMMARY OF THE INVENTION

It is therefore an object of the invention to provide a method and apparatus for generating data concerning partitions of land such as farmland at, high speed while reducing the burden on the user.

In one aspect, the invention provides a method of generating land partition data by analyzing an observation image of the land surface photographed by aerial photograph or satellite imagery, which comprises the steps of:

extracting the edges of the observation image;

extracting a rectangle region on the image by determining and connecting points of intersection with the edges and straight lines extended radially from a point on the image; and adjusting the extracted rectangle region by selecting and correcting it.

The edge extraction step may preferably be performed by using Canny method.

The edge extraction step may preferably be performed by using a filtering method employing a Sobel filter.

The edge extraction step may comprise a process of evaluating the extracted edges and eliminating short edges.

The edge extraction step may comprise a process of enhancing an extracted and selected edge.

The adjustment step may comprise a process of checking the area of an extracted rectangle region and eliminating the data in a minute rectangle region whose area is smaller than a predetermined area.

The adjustment step may comprise a process of modifying the shape of an extracted rectangle region by checking the angle of each vertex in the extracted rectangle region and eliminating a vertex having an acute angle smaller than a predetermined inner angle.

The adjustment step may comprise a process of comparing the shape of an extracted rectangle with a predetermined land rectangle pattern and eliminating the data in a rectangle region with a shape that is unnatural as a land shape.

The adjustment step may comprise a process of displaying a rectangle region that cannot be easily determined to be a land partition or not, and eliminating or correcting such rectangle region in accordance with an instruction from a user.

The rectangle region extraction step may comprise a primary extraction process and a secondary extraction process, the primary extraction process extracting a rectangle region on the image by determining and connecting points of intersection with the edges and straight lines extended radially from an arbitrary point on the image, the secondary extraction process extracting a rectangle region on the image by determining a center position in the extracted rectangle region, and determining and connecting points of intersection with the edges and straight lines extended radially from the center position.

In another aspect, the invention provides an apparatus for generating land partition data by analyzing an observation image of the land surface photographed by aerial photograph or satellite imagery, the apparatus comprising:

means for extracting edges of the observation image;

means for extracting a rectangle region by determining and connecting, in the image from which edges have been extracted, points of intersection with the edges and straight lines extended radially from a point on the image; and means for adjusting the extracted rectangle region by selecting and correcting it.

BRIEF DESCRIPTION OF THE DRAWINGS

FIG. 2(a) to (c) shows examples of the structure of rectangle data.

FIG. 11 shows a series of images illustrating the changes brought about in the original image by the edge extraction process in the embodiment.

DESCRIPTION OF THE INVENTION

The invention will be described by way of an embodiment with reference made to the drawings.

In the present embodiment, information concerning an ground image photographed by a high-altitude flying vehicle such as a satellite or airplane is fed to a land partition-data generating apparatus. The apparatus automatically examine the information to recognize a partition of land such as farmland and display an alert about unnatural portions. The apparatus then performs a fine-adjustment process in accordance with user inputs, and finally outputs rectangle information concerning the land partition.

Figure 1:
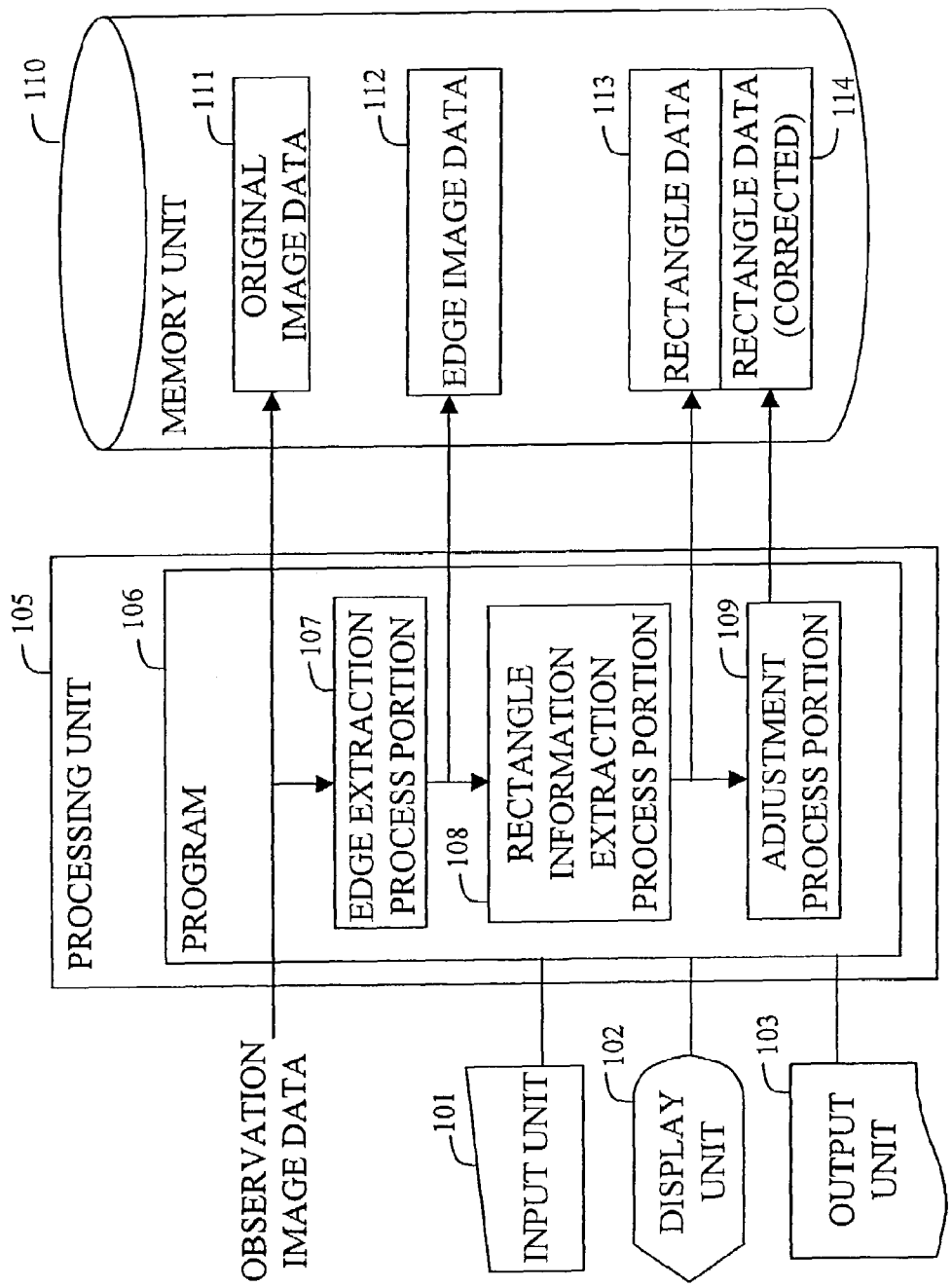
FIG. 1 shows a block diagram of a land-partition data generating apparatus according to an embodiment of the invention.

FIG. 1 shows a block diagram of the land partition data generating apparatus according to the embodiment of the invention.

The apparatus includes an input unit 101, a display unit 102, an output unit 103 such as a printer, a processing unit 105 and a memory unit 110.

The processing unit 105 runs a program 106 including an edge extraction process 107, a rectangle information extraction process 108 and an adjustment process 109. The memory unit 110 stores original image data 111, edge image data 112, and rectangle data 113, 114. The details of the rectangle data will be described by referring to FIG. 2.

The land partition data generating apparatus in the present embodiment runs the program 106 on input data concerning an ground image photographed by a high-altitude flying vehicle such as a satellite or airplane. Data 112, 113, 114 obtained by the above-mentioned processes, as well as the original image data 111, are stored in the memory unit 110. The data can be output as is, or utilized in another analysis system.

Figure 2C:
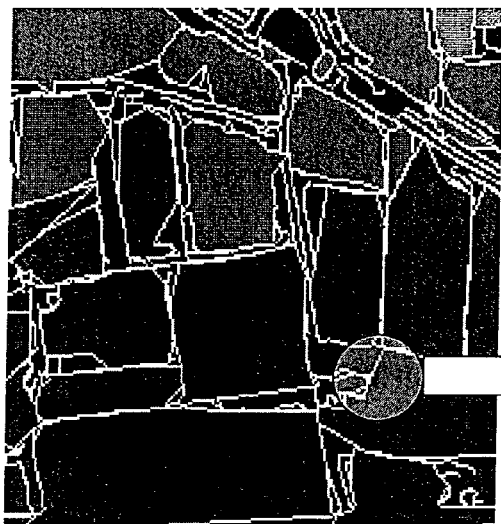

FIG. 2 illustrates the data structure of an example of rectangle data 113, 114 that is eventually generated by the apparatus. The rectangle data consists of rectangle management information shown in FIG. 2(a), rectangle information shown in FIG. 2(b), and rectangle image information shown in FIG. 2(c).

The rectangle management information includes individual items of rectangle information and statistical information of rectangle information. Specifically, the rectangle management information includes an ID 201 for uniquely identifying own rectangle management information, an original image ID 202 for uniquely identifying the original image prior to any processing, a rectangle information ID 203 for uniquely identifying corresponding rectangle image information, the number 204 of rectangles registered in the rectangle management information, an average area 205 of all of the registered rectangles, and information 206, 207 about individual rectangles that are registered.

The rectangle information consists of detailed information about each particular rectangle. Specifically, the rectangle information includes an ID 211 for uniquely identifying own rectangle information, the area 212 of the particular rectangle, the coordinates 213 of the center of the rectangle, the quantity 214 of a property such as the average luminance within the rectangle in the original image, the number 215 of the vertexes forming the rectangle, and the coordinates 216, 217 of each vertex.

The rectangle image information consists of data of the same format as that of ordinary image information and can be used e.g. for simple display purposes or for reverse look-up for the rectangle data from coordinate which belong to.

Specifically, in the rectangle image information, each pixel is assigned a value identifying whether the particular pixel is an extra-rectangle pixel (00), a boundary pixel (FF), or an intra-rectangle pixel, in a monochromatic format, as shown in FIG. 2(c). In particular, when each pixel belongs to less than one item of rectangle information, ID number (corresponding to the rectangle ID 211 in FIG. 2(b)) of rectangle information is used as the intra-rectangle pixel value, thus associating the rectangle image information with the rectangle information.

Figure 3:
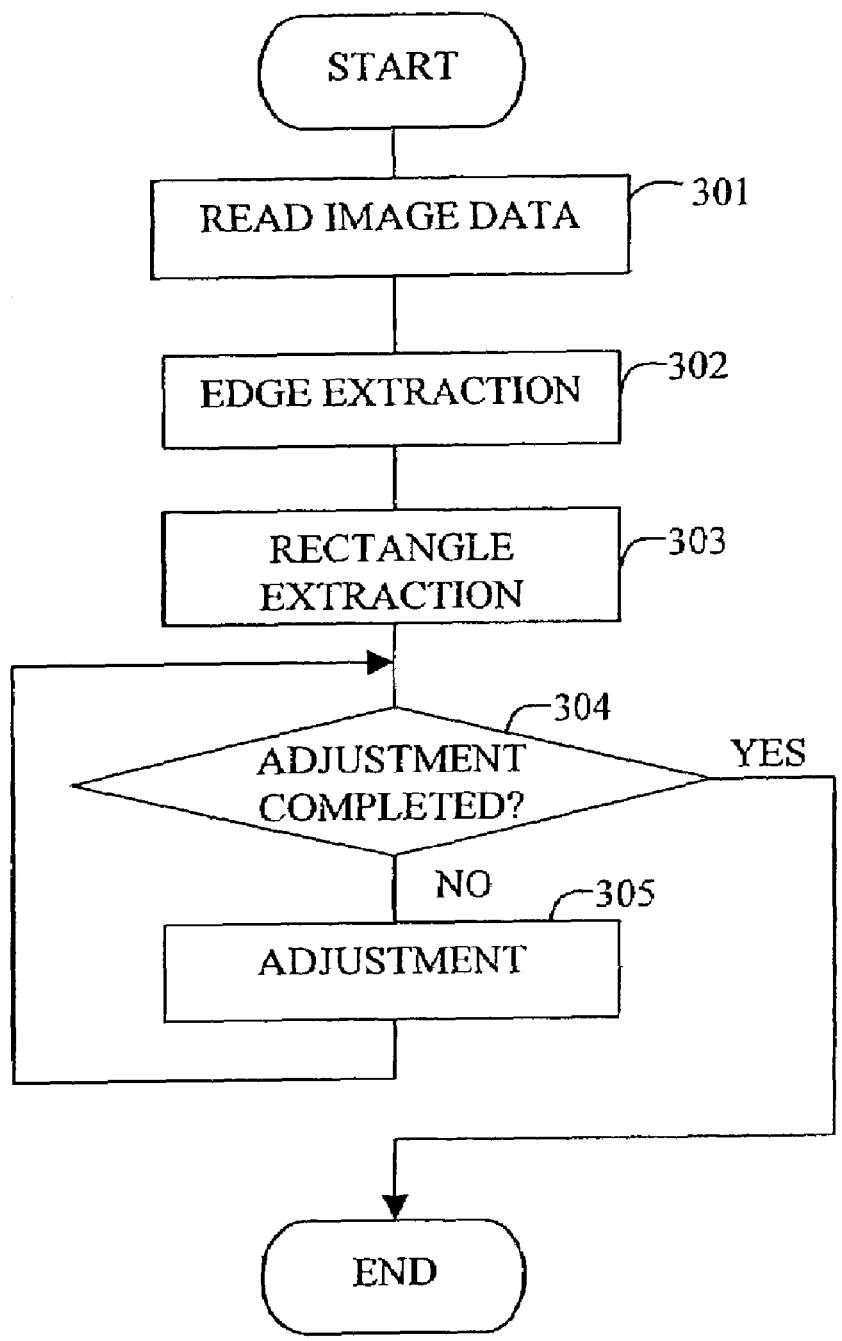
FIG. 3 shows a flowchart of the overall process.

FIG. 3 shows a flowchart of the program 106 run by the processing unit 105.

In step 301, observation image data is read and stored in the memory unit 110 as original image data 111.

In step 302, an edge extraction process is performed on the original image data 111, and resultant edge image data 112 is stored in the storage unit 110. The details of the edge extraction process will be described later by referring to FIG. 4.

In step 303, an automatic rectangle extraction process is performed, and resultant rectangle data 113 is stored in the memory unit 110. The details of the rectangle extraction process will be later described by referring to FIG. 6.

In step 304, it is then determined whether or not an adjustment process is completed. The method of determination depends on demand, so it may be based on an automatic decision, a threshold number of times, or an input by the user, for example. If the process is completed, final rectangle data 114 is stored in the memory unit 110 and the overall flow is terminated. If not, the adjustment process is performed in step 305, and then the routine returns to the decision in step 304. The details of the adjustment process will be described later by referring to FIG. 6.

Figure 4:
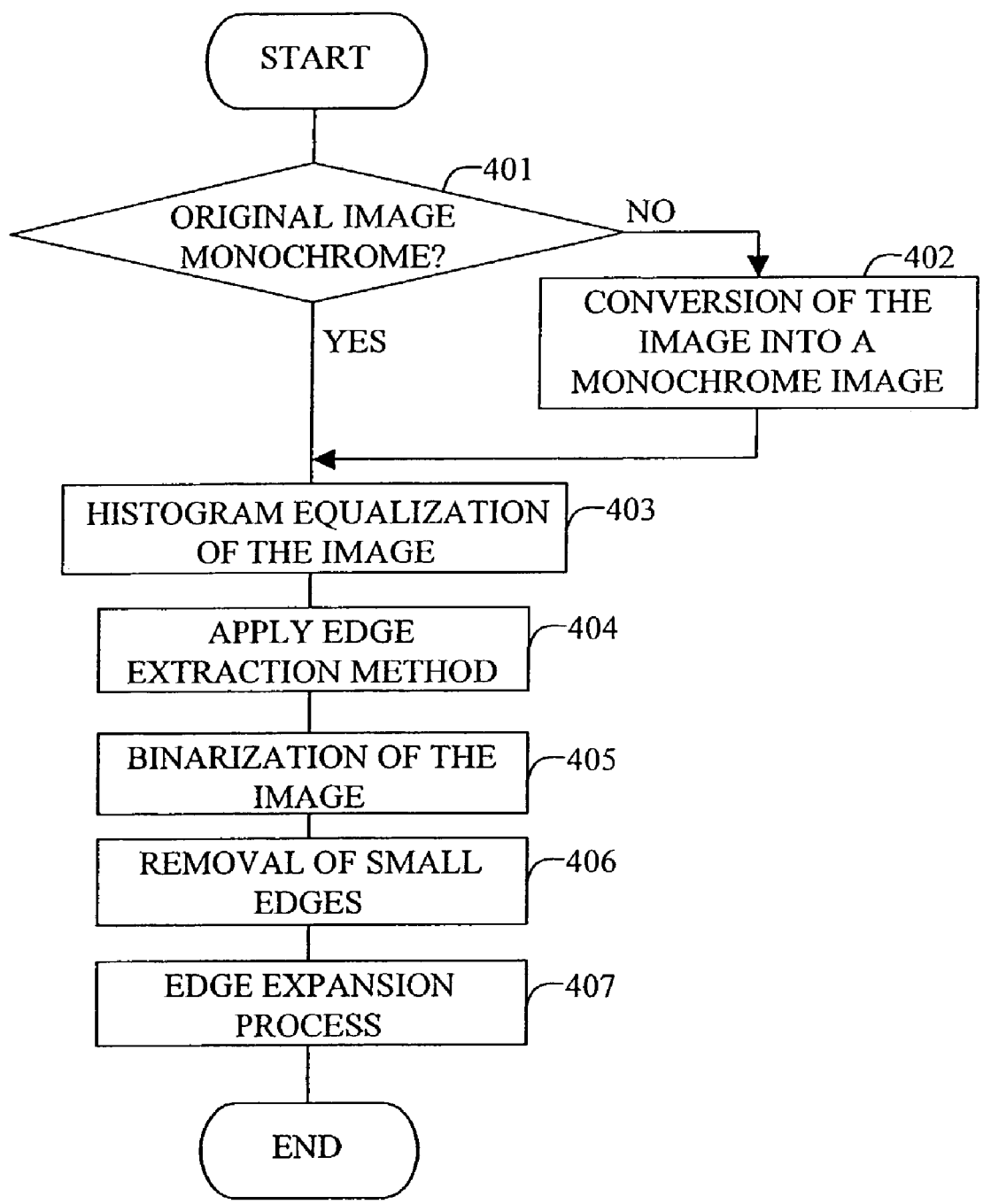
FIG. 4 shows a flowchart of an edge extraction process.

FIG. 4 shows a flowchart illustrating the details of the edge extraction process of FIG. 3 (step 302).

In the edge extraction process, which is a preliminary step to the extraction of a rectangle in an image, only those edge components that form a rectangle are extracted. Parameters such as a threshold value in the edge extraction process must be carefully chosen, because if the number of edges that are extracted is too small, the periphery of the rectangle may be terminated, while if the number is too large, identification of a rectangle may become difficult due to noise components. In step 401, it is first checked to see whether or not the original image is monochrome. If not, the image is converted into a monochrome image in step 402. In this step, in the case of an ordinary RGB color image, a primary conversion is effected by weighting the R, G and B elements of each pixel, thus calculating the monochromatic luminance. An example of a monochrome-converted image is shown in FIG. 11 under reference numeral 1101.

Then, in step 403, a histogram equalization process is performed on the image. Histogram equalization is a filtering process in which the distribution of pixel values in the whole image or a part of image is examined and each pixel is re-distributed pixel value so that the average value of the pixel values becomes equal to a mean value. This process is performed to enable edges to be detected even in an image with little variance. An example of a histogram-equalized image is shown in FIG. 11 under reference numeral 1102.

Thereafter, an edge extraction technique is applied in step 404. Examples of the edge extraction technique include the Canny method (J. Canny, A Computational Approach to Edge Detection. IEEE Transactions on Pattern Analysis and Machine Intelligence, Vol. PAMI-8, No. 6, November 1986), and a filtering process employing a Sobel filter (Mamoru Ogami, Image Processing Handbook. 1987, Shokodo Co., Ltd.).

An example of an edge image extracted by the Canny method is shown in FIG. 11 under reference numeral 1103.

Next, the image is binarized in step 405. Binarization of the image is a filtering process whereby relative magnitudes of the luminance value of each pixel and a threshold value are examined and pixels larger than the threshold are substituted with a maximum value and pixels smaller than the threshold are substituted with a minimum value. As a result, the individual pixels are divided into one group representing edges and the other not representing any edges. The threshold value is either set in advance or determined based on the statistical information about an image or a part thereof. An example of a binarized image is shown in FIG. 11 under reference numeral 1104.

In step 406, a process for eliminating short edges is performed. The details of the short-edge eliminating process will be described later by referring to FIG. 5. An example of an image after eliminating short edges is shown in FIG. 11 under reference numeral 1105.

Then, in step 407, an edge enhancing process is performed using a technique such as morphology (Shigeru Mase et al., Morphology and Image Analysis [I]. Journal of IEICE (The Institute of Electronics, Information and Communication Engineers), Vol. 74, No. 2, pp. 164–174, February 1991). An example of an image after the enhancing processing is shown in FIG. 11 under reference numeral 1106. The image obtained by the above-described series of processes is stored in the memory unit 110 as edge image data 112, and the routine comes to an end.

Figure 5:
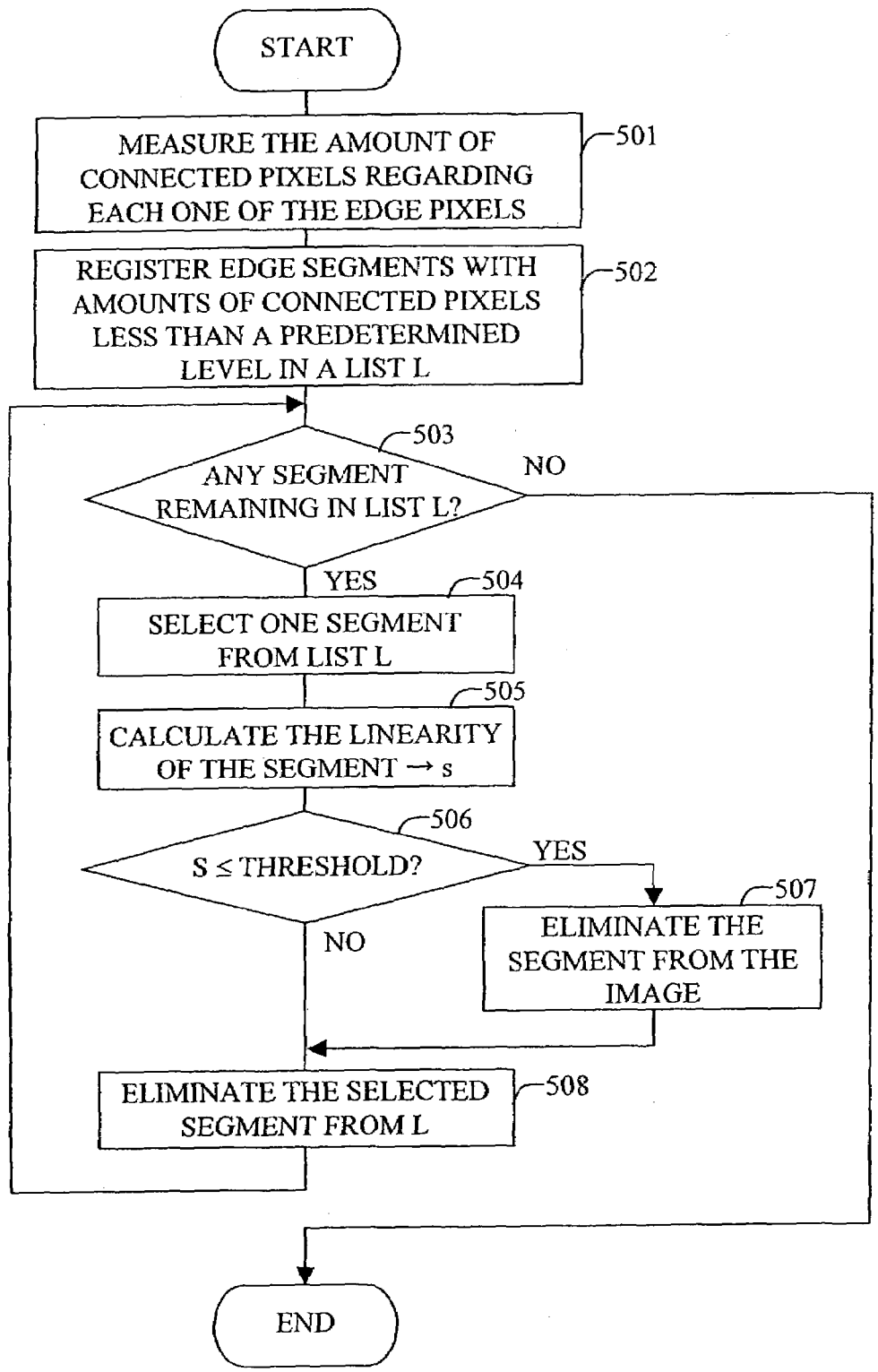
FIG. 5 shows a flowchart of a short-edge elimination process.

FIG. 5 shows a flowchart of the short-edge eliminating process of FIG. 4 (step 404).

This process is performed for eliminating noise in the edge image. It should be noted that short edges having strong straight-line components are not eliminated so as not to erroneously erase part of the segments forming a rectangle. In this short-edge eliminating process, the number of edge pixels connected to each pixel representing the edge is determined in step 501. Thereafter, in step 502, the segments formed by those pixels with the number of connected pixels smaller than predetermined number are registered in a list L. By varying the threshold value in this process, the amount of edges that are eliminated can be controlled.

In step 503, it is checked to see if there is any segment remaining in the list L. If there is not any, the routine comes to an end. If there is any, one segment is selected in step 504, its straightness is evaluated, and an evaluation value is substituted in s in step 505. The evaluation of the straightness is carried out by using a technique such as template matching (F. Kishino et al., Image and Spatial Information Processing. Iwanami Shoten, Publishers, 2000).

Then, it is checked to see if the value of s is below the threshold value in step 506. If it is, the segment is eliminated from the image in step 507.

The selected segment is further eliminated from the list L in step 508, and the routine returns to step 503.

Figure 6:
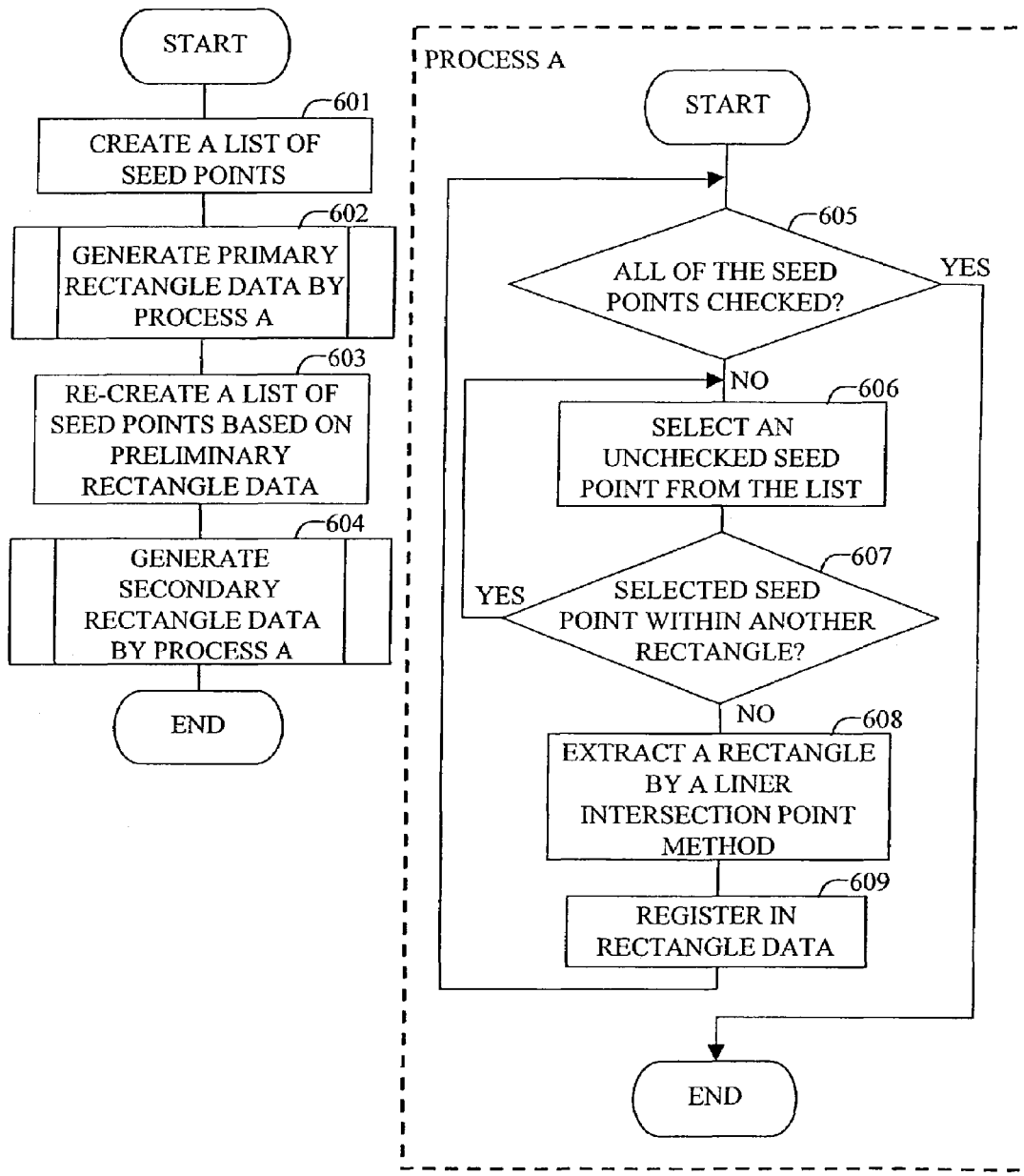
FIG. 6 shows a flowchart of a rectangle extraction process.

FIG. 6 shows a flowchart of the details of the rectangle extraction process of FIG. 3 (step 303).

In the rectangle extraction process, rectangles are automatically extracted from the edge-extracted image. In the present embodiment, in order to increase the level of accuracy, the rectangle extraction process is carried out in two steps, namely a primary extraction and a secondary extraction. Initially, in step 601, seed points are arbitrarily determined in the image to be processed, and then a list of those seed points is created.

A seed point means the coordinate of the point from which the rectangle extraction process start. The seed points may be determined by arranging them in a grid pattern or in a random manner. Next, in step 602, a process A of the processes in steps 605 to 609 enclosed by a broken line in FIG. 6 is performed by using the list of seed points created in step 601, thus generating primary rectangle data.

Next, a new list of seed points each of which is positioned at (or near) the center of each rectangle region is created in step 603 based on the rectangle data generated in step 602 by locating the center of gravity in each rectangle, for example. Then, the process A consisting of steps 605 to 609 is repeated by using the new list of seed points, thus generating secondary rectangle data.

In the process A, one rectangle is extracted for one seed point in accordance with the seed-point list. The details of the process will be described below.

In step 605, it is checked to see if the checking process from steps 606 to 609 has been performed on all of the seed points in the list. If so, the routine is terminated. If not, one seed point that is not yet checked is selected from the list in step 606. It is then checked in step 607 to see whether or not the selected seed point is located inside any of the rectangles that have so far been extracted. If it is, the checking of the seed point comes to an end, and the routine returns to step 606.

Figure 7:
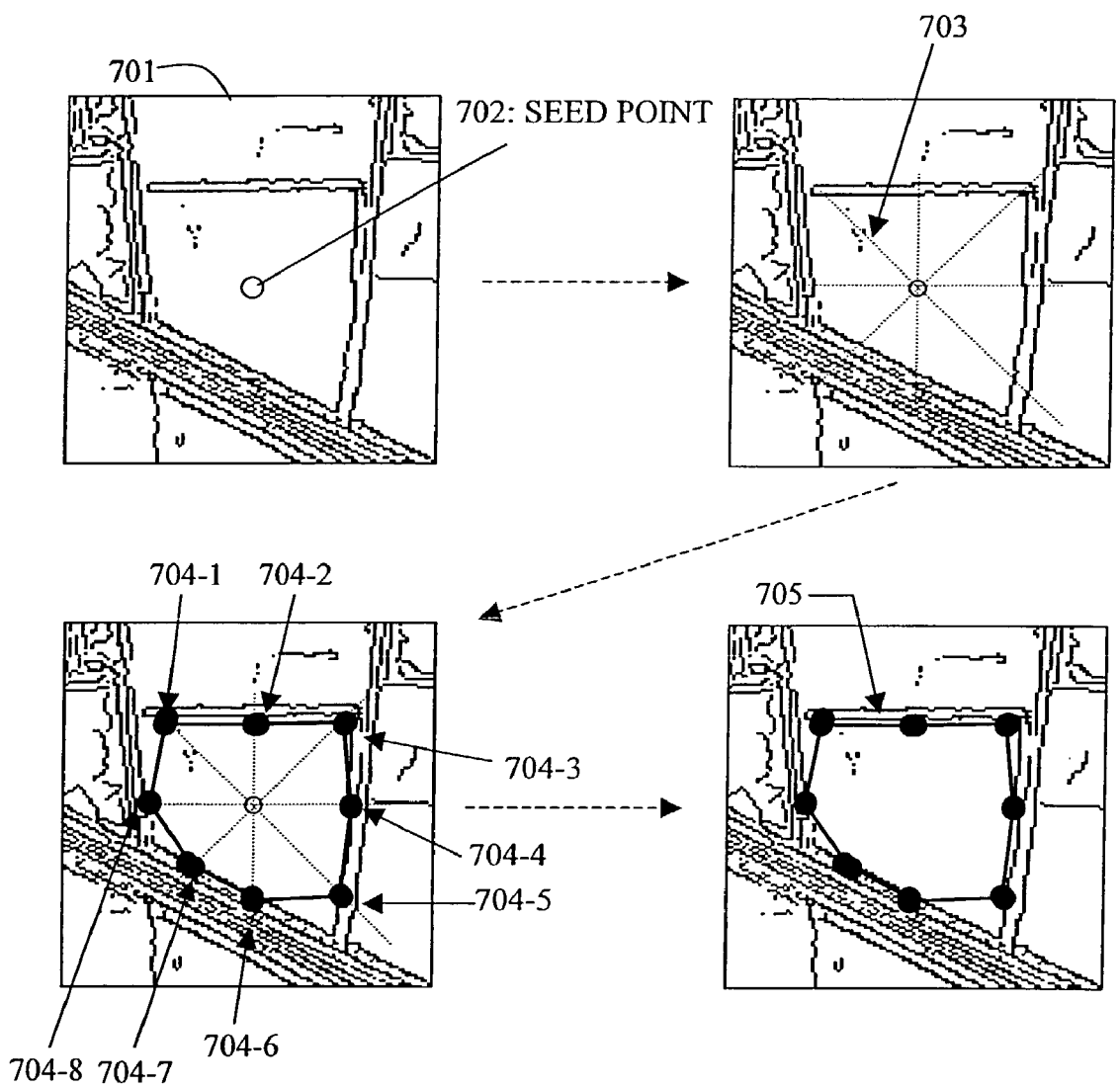
FIG. 7 illustrates the rectangle extraction process by the linear intersection point method.

If the selected seed point is not included in any of the rectangles, a rectangle is extracted by a linear intersection point method in step 608, by which the present invention is characterized. The details of the linear intersection point method is illustrated in FIG. 7.

Rectangle data indicating the resultant rectangle is registered in step 609, and the routine returns to step 605.

Figure 13:
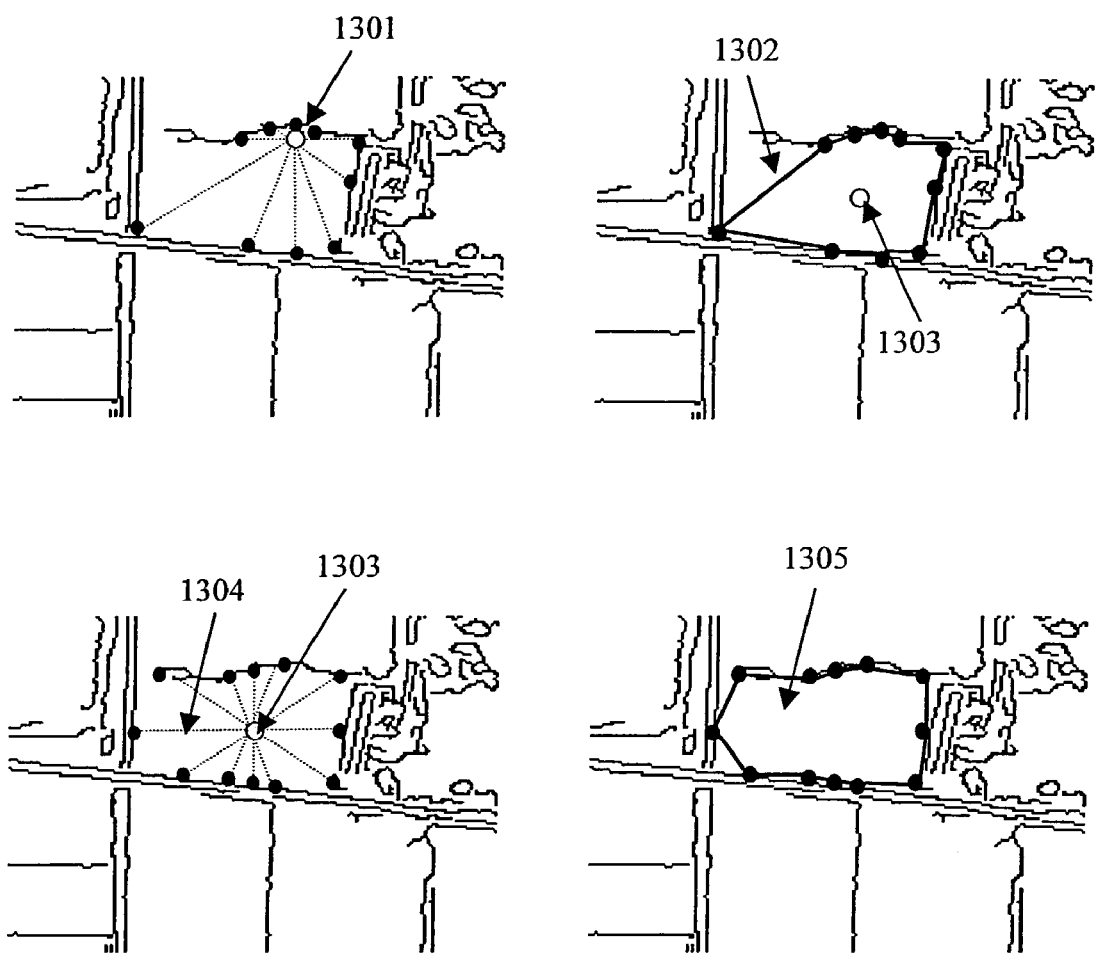
FIG. 13 shows a series of images illustrating the changes brought about by the rectangle extraction process in the embodiment.

The rectangle extraction process can be simplified by using the rectangle data obtained only by the processes of steps 601 and 602 as is. In this case, however, accurate rectangle data may not be obtained, particularly when the seed point is located at the edge of a rectangle, due to the random nature of the process of creating the seed-point list. FIG. 13 shows an example of an image of an inaccurate rectangle. In the example of FIG. 13, when the rectangle-region extraction process of step 602 is performed on the basis of the seed point 1301, which was randomly arranged, the resultant primary rectangle data indicates a rectangle region designated by numeral 1302.

To cope with this problem, the processes of steps 603 and 604 are performed, whereby the center of gravity (or just the center, or a vicinity thereof) of the primary rectangle data is selected as a new seed point 1303. Straight lines 1304 are extended radially from the seed point 1303 and their points of intersection with the edges are determined. The individual points of intersection are then connected to extract secondary rectangle data 1305, which is more accurate than the primary rectangle data.

FIG. 7 illustrates the details of the process by the linear intersection point method of FIG. 6 (step 608). In this process, a rectangle including a seed point is extracted from a given edge image and the coordinates of a point that designates the seed point.

It will be assumed that an edge image 701 and a seed point 702 are given. Straight lines 703 are extended from the seed point in all directions at equal angular intervals. Points of intersection 704-1 to 704-8 of the individual lines and edge pixels in the edge image are determined. The resultant points of intersection 704-1 to 704-8 are connected to extract a rectangle region 705 within the image.

Rectangle data consists of a list of vertexes forming the rectangle region 705. The number of the vertexes varies depending on the number of the straight lines that are radially extended. By increasing the number of the straight lines, a more precise rectangle can be extracted. This may, however, result in detecting the points of intersection with noise components those exist in the edge image. Accordingly, the number of the straight lines should be set appropriately in view of the type of the image and the particular purposes.

Figure 8:
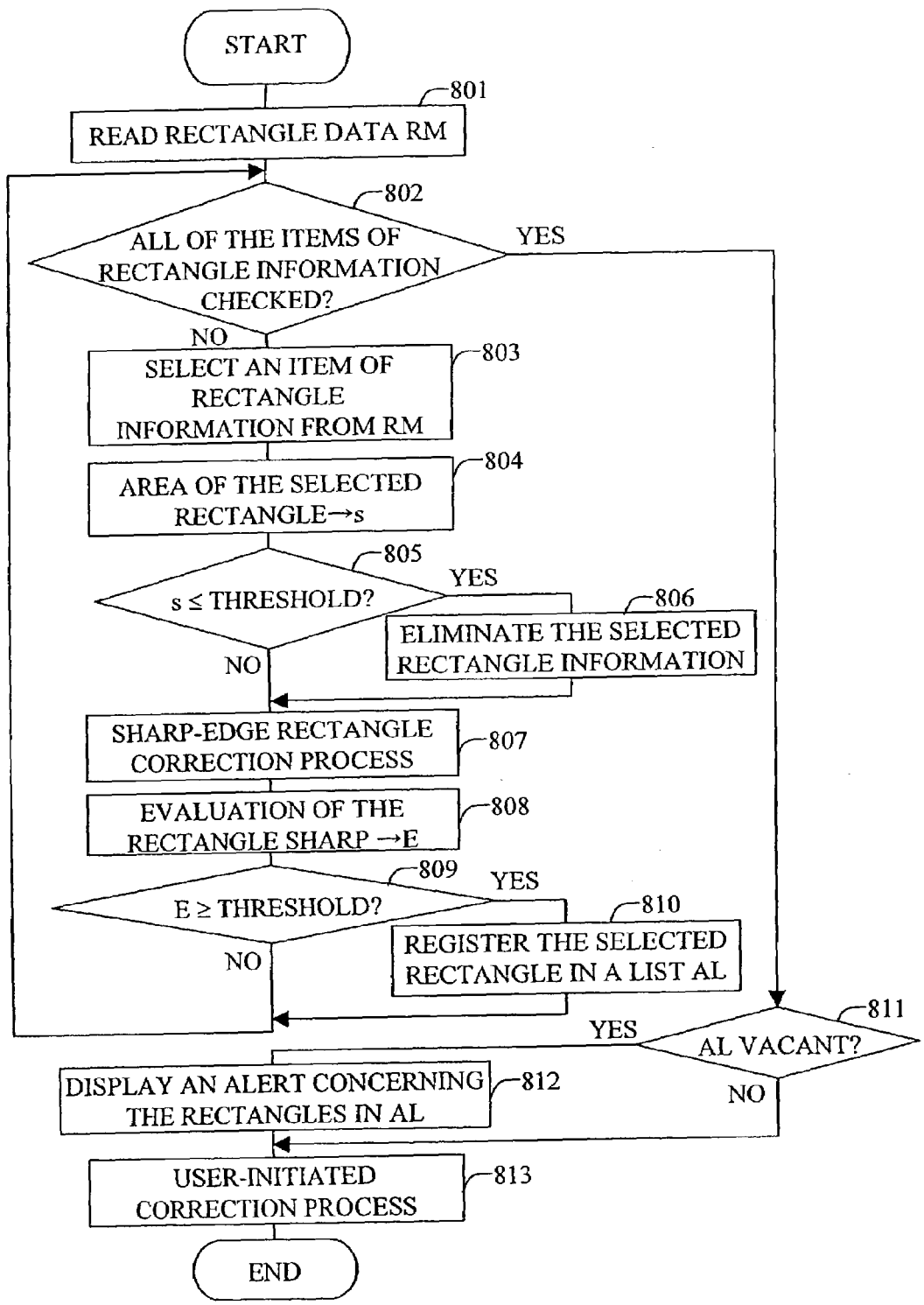
FIG. 8 shows a flowchart of an adjustment process.

FIG. 8 shows a flowchart of the adjustment process of FIG. 3 (step 305). In the adjustment process, the rectangle data obtained by the previous processes are checked to detect or eliminate unnatural rectangle data. The checking of the rectangle data mainly consists of a area check and a shape check. Initially, rectangle data RM generated by the previous step of rectangle extraction process (step 303) is read in step 801.

It is then checked in step 802 to see if all of the rectangle information registered in the above-read rectangle data RM has been checked. If so, the routine goes on to step 811. If there is rectangle information that has not been checked, one item of such unchecked rectangle information is selected in step 803, and the area of the relevant rectangle is calculated and substituted in variable s in step 804. It is then checked in step 805 to see if the area s of the rectangle is smaller than a predetermined threshold. If it is, the selected rectangle information is deleted in step 806. The threshold value for the area check is determined in light of the purpose and the resolution of the image, for example.

Figure 9:
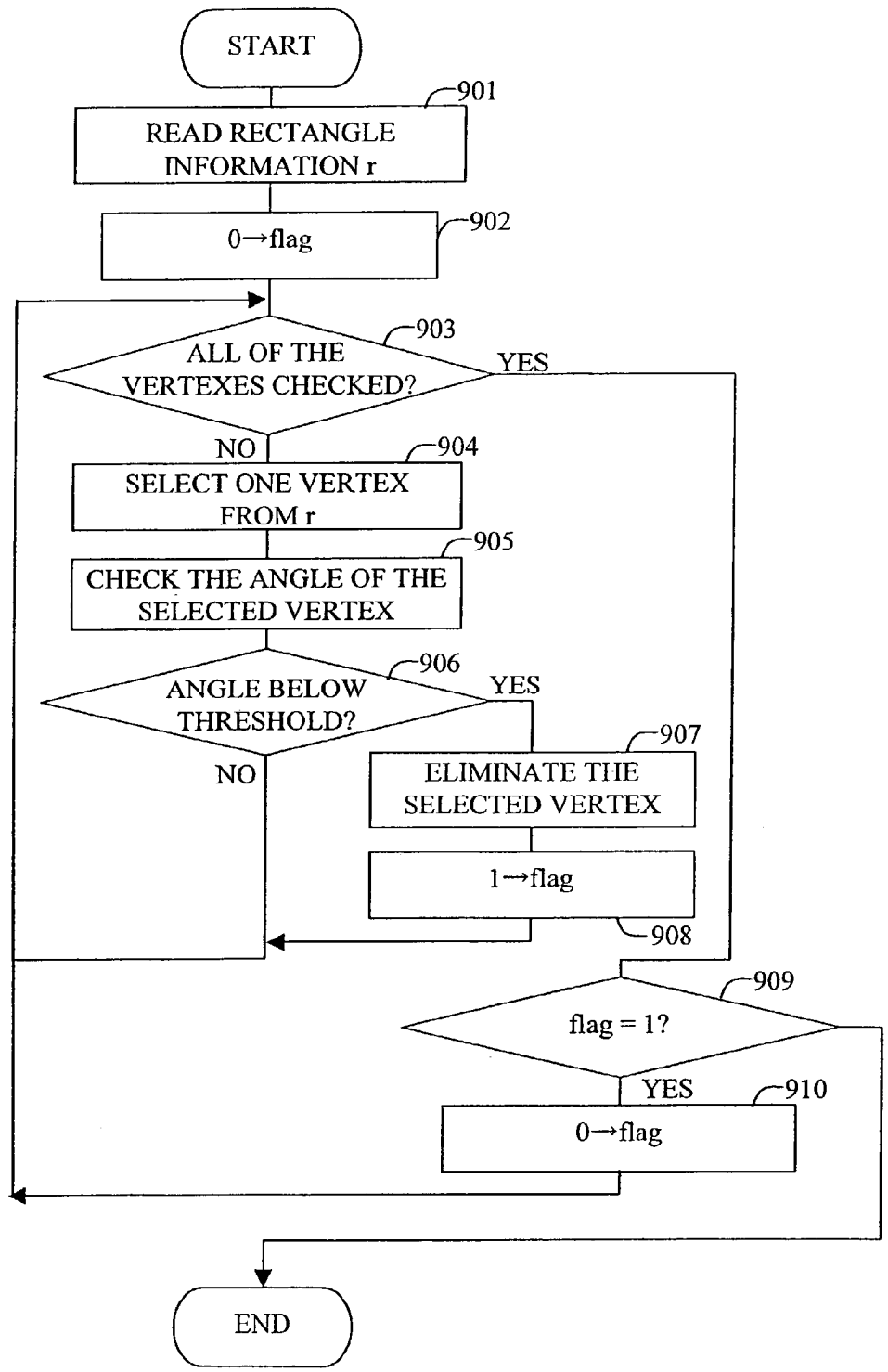
FIG. 9 shows a flowchart of a sharp-edge rectangle correction process.

Next, in step 807, a sharp-edge rectangle correction process is performed. This is part of the process of checking the shape of a rectangle, whereby portions in the rectangle that are formed by extremely acute angles are corrected. The details of this process are illustrated in FIG. 9.

Then, the shape of the rectangle is evaluated and an evaluation value is substituted in variable E in step 808. The evaluation of the shape of the rectangle is a process for reducing distortions generated during rectangle extraction due to noise or the like. In this evaluation, the rectangle is evaluated by using a pattern recognition technique (such as known from A. Kawada et al., Image Data Processing for Scientific Measurement. CQ Publishing Co., Ltd, 1994) to see if the rectangle has any unnatural shape as a land rectangle, such as a rectangle with one of the sides excessively depressed in the shape of U, or an extremely slim and long shape.

It is then checked in step 809 to see if the evaluation value E exceeds the threshold value. If it does, the rectangle is registered in an alert rectangle list AL in step 810, and then the routine returns to step 802. The threshold value in step 809 relates to how strictly the shape should be checked, and it varies depending on the image and the purpose, for example.

If it is determined in step 802 that all of the rectangle information has been checked, it is then checked in step 811 to see if there is any rectangle registered in the alert rectangle list AL. If there is, the registered rectangle is displayed on the screen of the display unit 102 in step 812.

Figure 10:
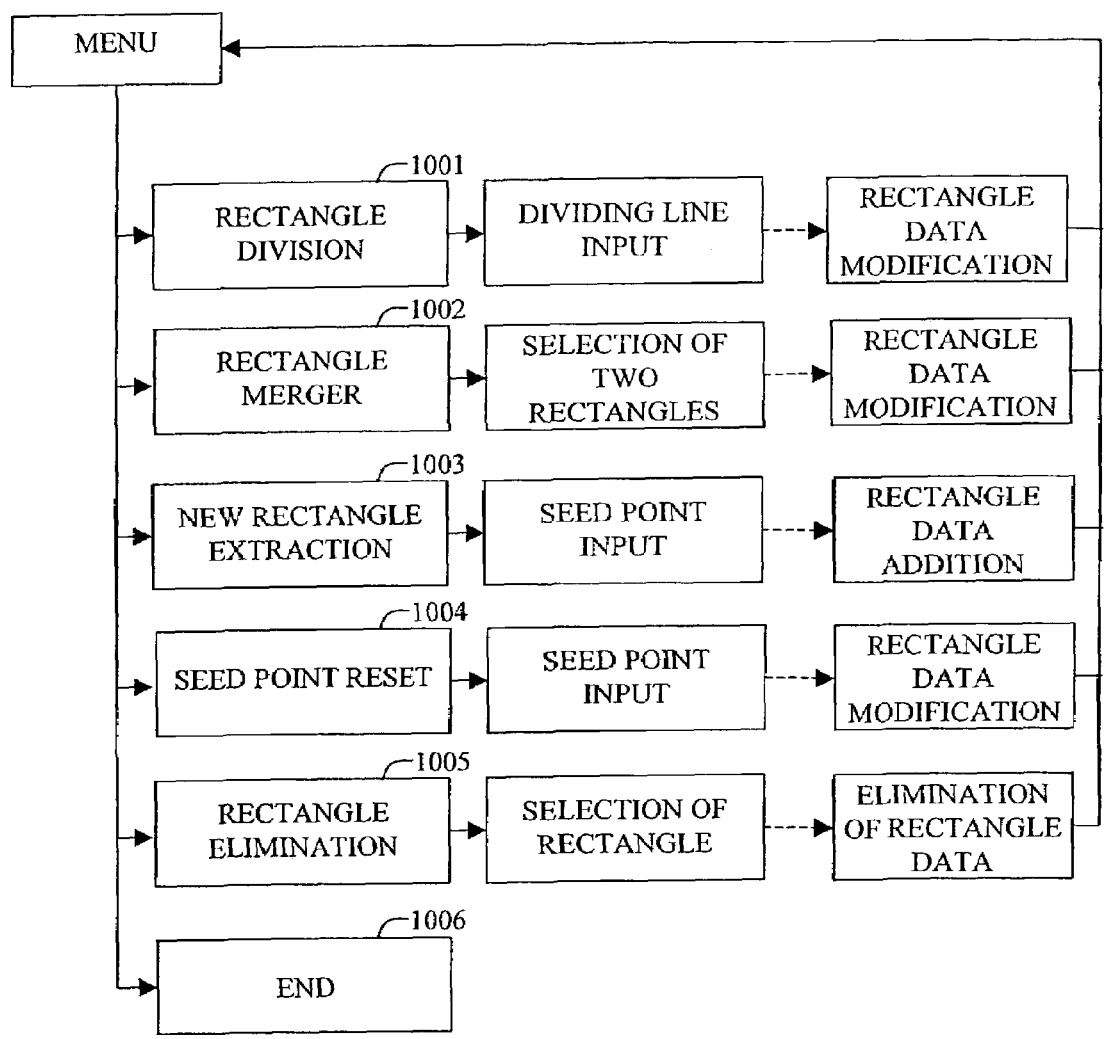
FIG. 10 shows a block diagram of a correction process performed by the user.

The user then performs a correction process in step 813, and the routine comes to an end. The details of the correction process are illustrated in FIG. 10.

FIG. 9 shows a flowchart of the details of the sharp-edge rectangle correction process of FIG. 8 (step 807). In this process, unnaturalness in a detected rectangle due to noises included in the edge image or imperfection in edges is corrected.

Figure 12:
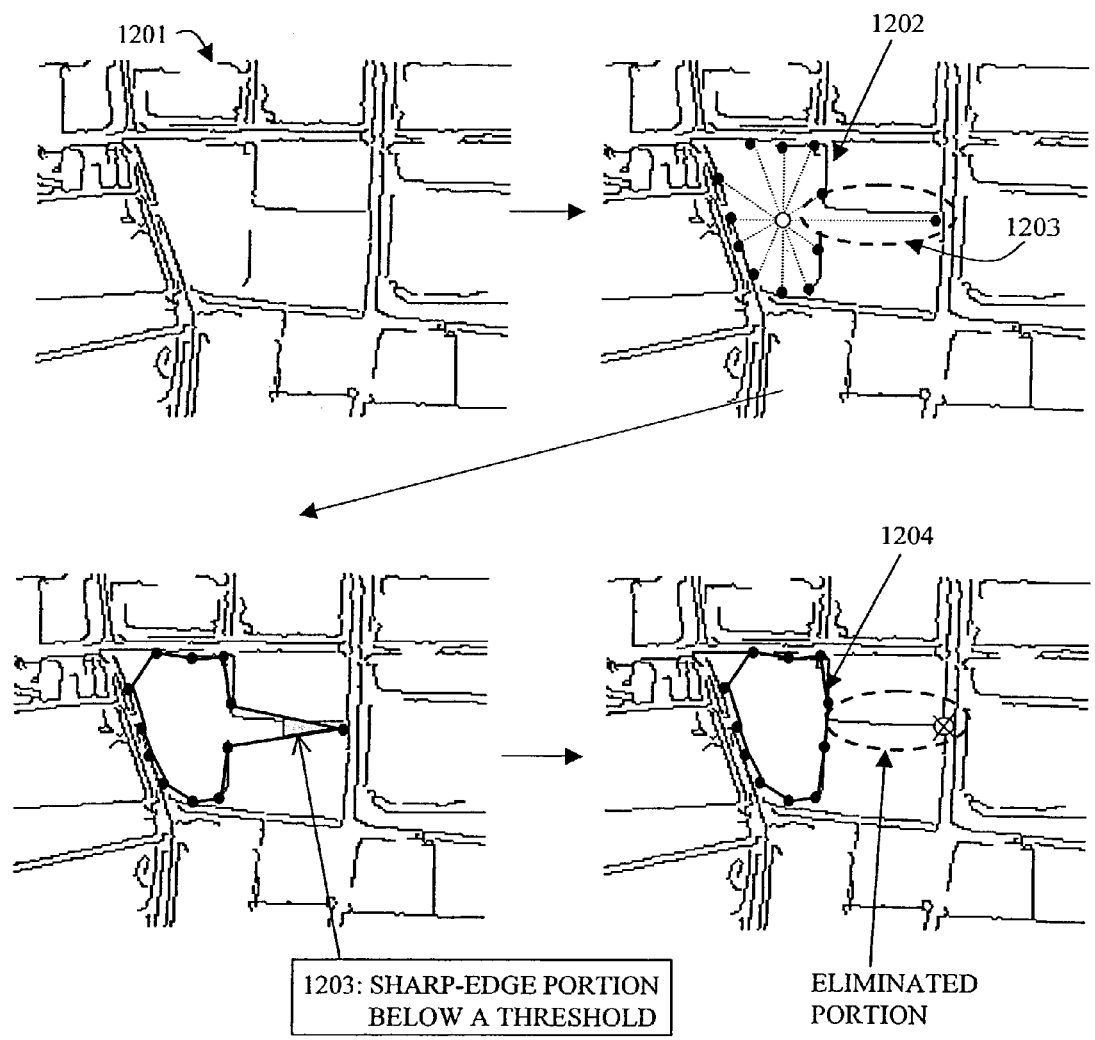
FIG. 12 shows a series of images illustrating the changes brought about by the sharp-edge rectangle correction process in the embodiment.

For example, this process is effective when there is a point of intersection formed by the linear intersection point method that is due to noise and located extremely far away. FIG. 12 shows an example of an image of rectangle data corrected by this process. In this process, initially rectangle information r to be corrected is read in step 901. In step 902, "0" is substituted in a flag variable "flag" indicating whether or not a correction has been made.

In step 903, it is then checked to see if all of the vertexes registered in the rectangle information r has been checked. If so, the routine goes on to step 909. If not, one of the vertexes that have not been examined is selected in step 904, and the angle of the selected vertex formed by the two sides is examined in step 905.

Then, in step 906, it is determined whether the angle is smaller than a predetermined threshold value. The threshold value relates to how acute the angle can be in natural-shape rectangles, so it depends on the purpose and the type of image. If the angle is smaller than the threshold, rectangle data is re-generated by eliminating the vertex in step 907, and "1" is substituted in flag in step 908. Whether yes or no in step 906, the routine returns to step 903.

If it is determined in step 903 that all of the vertexes have been checked, it is then checked to see if the variable flag is 1 in step 909. If it is 1, 0 is substituted in flag in step 910, and the routine returns to step 903. If it is not 1, the routine comes to an end.

In the example of FIG. 12, when an original edge image 1201 is subjected to the linear intersection point method to extract a rectangle, a rectangle 1201 having an extremely sharp edge portion 1203 is recognized. Such a shape is unnatural as a land partition and, therefore, the sharp edge portion is judged to be smaller than the threshold in the sharp-edge rectangle correction process. Thus, the relevant vertex is eliminated in step 907, thus producing a rectangle 1204.

FIG. 10 shows a block diagram of the user-initiated correction process of FIG. 8 (step 813). This correction process is performed in accordance with a user input, after an unnatural shape of a rectangle is indicated by the alert rectangle display process of FIG. 8 (step 812).

The user confirms the rectangle information and the rectangle to which the user was alerted as to its unnatural shape, and then he or she inputs a command via a menu.

The command can be selected from a rectangle partition 1001, a rectangle merger 1002, new rectangle extraction 1003, seed point reset 1004, rectangle elimination 1005, and end 1006.

When the rectangle partition 1001 is selected, the user further inputs a rectangle to be divided and a start and an end point of a line dividing the rectangle. In response, the apparatus modifies the rectangle data in accordance with the input information.

When the rectangle merger 1002 is selected, the user further selects two adjacent rectangles that are to be merged. The apparatus then modifies the rectangle data in accordance with the input information.

When the new rectangle extraction 1003 is selected, the user further inputs a new seed point, extracts a new rectangle by the linear intersection point method (see FIG. 7) based on the new seed point, and registers the new rectangle in the rectangle data.

When the seed point reset 1004 is selected, the user further inputs another point. The apparatus then eliminate the rectangle including the input point and re-entry a rectangle extracted by using the linear intersection point method in which input point is used as seed point.

When the rectangle elimination 1005 is selected, the user further selects a rectangle. The apparatus then eliminates the information about the selected rectangle from data.

Finally, the end 1006 is selected and the routine comes to an end.

FIG. 11 shows sample images after the edge extraction process. The individual images correspond to the description of FIG. 4.

FIG. 12 shows sample images in the sharp-edge rectangle process. The individual images visually describe the sharp-edge rectangle process. The images correspond to the description of FIG. 9.

FIG. 13 shows samples of changes in the rectangle data in the rectangle extraction process. The individual images visually describe the flow of the rectangle extraction process. The images correspond to the description of FIG. 6.

Thus, in the present embodiment, a routine (linear intersection point method) is automatically initiated whereby points of intersection of straight lines radially extending from an arbitrary point on the photographed ground image and the edges are determined, and a rectangle region on the image is extracted by connecting those intersection points. Thus, a rectangle corresponding to a partition of land such as farmland can be extracted.

In accordance with this method, when the coordinates of a point on the image are designated, straight lines are extended from that point in all directions at predetermined angular intervals. By determining the points of intersection of the individual straight lines and edge pixels in an edge image, a rectangle in the image can be extracted. By automatically setting the seed point, all possible rectangles in the image can be automatically recognized. Further, this process is simpler than the edge trace method, so that it can be completed in less time.

Furthermore, by introducing the adjustment process step, the burden on the user can be minimized and the recognition rate can be improved. Specifically, in the adjustment process step, those rectangles recognized by the linear intersection point method are judged to be inappropriate as farmland partitions in terms of their size or shape, and the user is informed about them, and then the user's decision is incorporated.

Thus, in accordance with the invention, data concerning partitions of land such as farmland can be generated at high speed while minimizing the burden on the user.

What is claimed is:

1. A method of generating land partition data by analyzing an observation image of the surface of the earth photographed by aerial photograph or satellite imagery, comprising the steps of:
   extracting the edges of the observation image; and
   extracting a rectangle region on the image by determining and connecting points of intersection of a plurality of straight lines extending radially from a point on the image and the edges.

2. The method of generating land partition data according to claim 1, wherein the edge extraction step is performed by using a Canny method.

3. The method of generating land partition data according to claim 1, wherein the edge extraction step is performed by using a filtering method employing a Sobel filter.

4. The method of generating land partition data according to claim 1, wherein the edge extraction step comprises a process of evaluating the extracted edges and eliminating short.

5. The method of generating land partition data according to claim 4, wherein the edge extraction step comprises a process of enhancing an extracted and evaluated edge.

6. The method of generating land partition data according to claim 1, wherein the rectangle region extraction step comprises a primary extraction process and a secondary extraction process, the primary extraction process extracting a rectangle region on the image by determining and connecting points of intersection of a plurality of straight lines extending radially from an arbitrary point on the image and the edges, the secondary extraction process extracting a rectangle region on the image by determining a center position in the extracted rectangle region, and determining and connecting points of intersection of a plurality of straight lines extending radially from the center position and the edges.

7. A method of generating land partition data by analyzing an observation image of the surface of the earth photographed by aerial photograph or satellite imagery, comprising the steps of:
   extracting the edges of the observation image,
   extracting a rectangle region on the image by determining and connecting points of intersection of a plurality of straight lines extending radially from a point on the image and the edges, and
   adjusting step comprises the extracted rectangle region.

8. The method of generating land partition data according to claim 7, wherein the adjustment step comprises a process of checking the area of
   an extracted rectangle region and eliminating the data in a minute rectangle region whose area is smaller than a predetermined area.

9. The method of generating land partition data according to claim 7, wherein the adjustment step comprises a process of modifying the shape of an extracted rectangle region by checking the angle of each vertex in the rectangle region and eliminating a vertex having an acute angle smaller than a predetermined inner angle.

10. The method of generating land partition data according to claim 7, wherein the adjustment step comprises a process of comparing the shape of an extracted rectangle with a predetermined land rectangle pattern and eliminating the data in a rectangle region with a shape that is unnatural as a land shape.

11. The method of generating land partition data according to claim 7, wherein the adjustment step comprises a process of displaying a
   rectangle region that cannot be easily determined to be a land partition or not, and eliminating or correcting the rectangle region in accordance with an instruction from a user.

12. An apparatus for generating land partition data by analyzing an
   observation image of the surface of the earth photographed by aerial photograph or satellite imagery, comprising:
   means for extracting edges of the observation image; and
   means for extracting a rectangle region by determining and connecting, in the
   image from which edges have been extracted, points of intersection of a plurality of straight lines extending radially from a point on the image and the edges.

13. An apparatus for generating land partition data by according to claim 12, further including means for adjusting the extracted rectangle region.

* * * * *